United States Patent
Dunn et al.

(10) Patent No.: US 8,576,354 B2
(45) Date of Patent: Nov. 5, 2013

(54) CHANNELIZED PLATE

(75) Inventors: William Dunn, Alpharetta, OH (US);
Michael LeCave, Alpharetta, GA (US);
Harry Presley, Alpharetta, GA (US)

(73) Assignee: American Panel Corporation,
Alpharetta, GA (US)

( * ) Notice: Subject to any disclaimer, the term of this patent is extended or adjusted under 35 U.S.C. 154(b) by 939 days.

(21) Appl. No.: 12/192,285

(22) Filed: Aug. 15, 2008

(65) Prior Publication Data
US 2009/0322987 A1    Dec. 31, 2009

Related U.S. Application Data

(60) Provisional application No. 61/076,127, filed on Jun. 26, 2008.

(51) Int. Cl.
*G02F 1/1335*    (2006.01)
(52) U.S. Cl.
USPC .................................. 349/66; 349/61; 349/64
(58) Field of Classification Search
USPC ....................................................... 349/11, 66
See application file for complete search history.

(56) References Cited

U.S. PATENT DOCUMENTS

| | | | |
|---|---|---|---|
| 4,708,439 A * | 11/1987 | Ishii et al. | 349/64 |
| 4,773,730 A | 9/1988 | Sedlmayr | |
| 5,104,210 A | 4/1992 | Tokas | |
| 5,329,386 A | 7/1994 | Birecki et al. | |
| 5,600,456 A * | 2/1997 | Maruyama et al. | 349/64 |
| 5,671,028 A * | 9/1997 | Okano | 349/66 |
| 7,430,028 B2 * | 9/2008 | Tsai et al. | 349/65 |
| 2004/0061812 A1* | 4/2004 | Maeda | 349/65 |
| 2008/0069505 A1 | 3/2008 | Reichel et al. | |

FOREIGN PATENT DOCUMENTS

JP    06313816    11/1994
JP    07198957    8/1995

OTHER PUBLICATIONS

Machine translation of JP6-313816A; Nov. 8, 1994.*
Capillary Arrays, SCHOTT glass made of ideas, retrieved Jun. 16, 2008, 2 pages, available at www.us.schott.com/fiberoptics.
Multi-fiber, Collimated Holes, Inc., retrieved Jun. 16, 2008, 2 pages, available at http://www.collimatedholes.com/multi-fiber.html.

* cited by examiner

*Primary Examiner* — Wen-Ying P Chen
(74) *Attorney, Agent, or Firm* — Standley Law Group LLP

(57) ABSTRACT

Preferred embodiments utilize a plurality of optical channels to effectively aim the light emitted by a liquid crystal display (LCD). Embodiments may also change the nominal and range of viewing angles of light in two or three dimensions in order to confine the emitted light towards the intended observer.

21 Claims, 12 Drawing Sheets

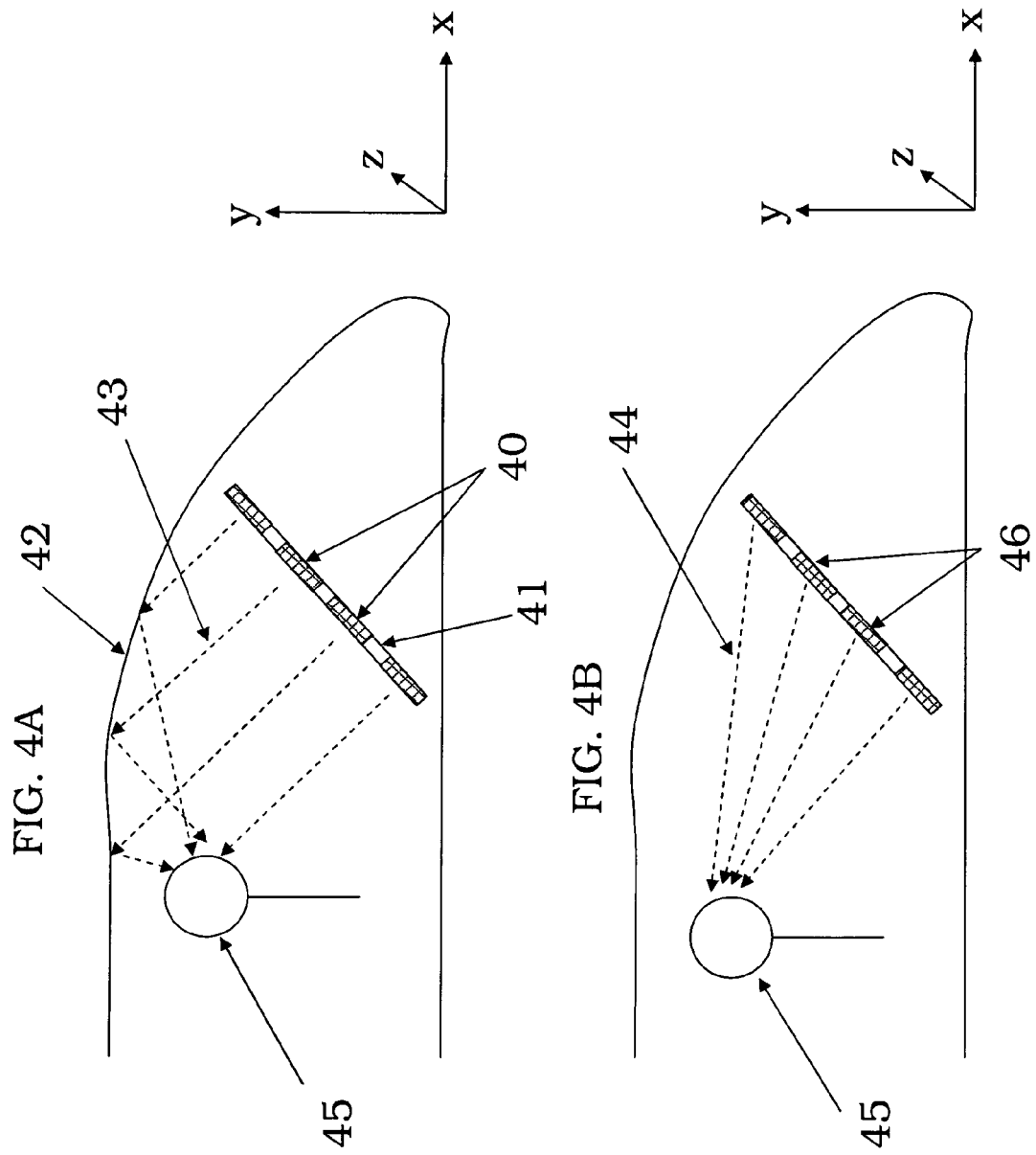

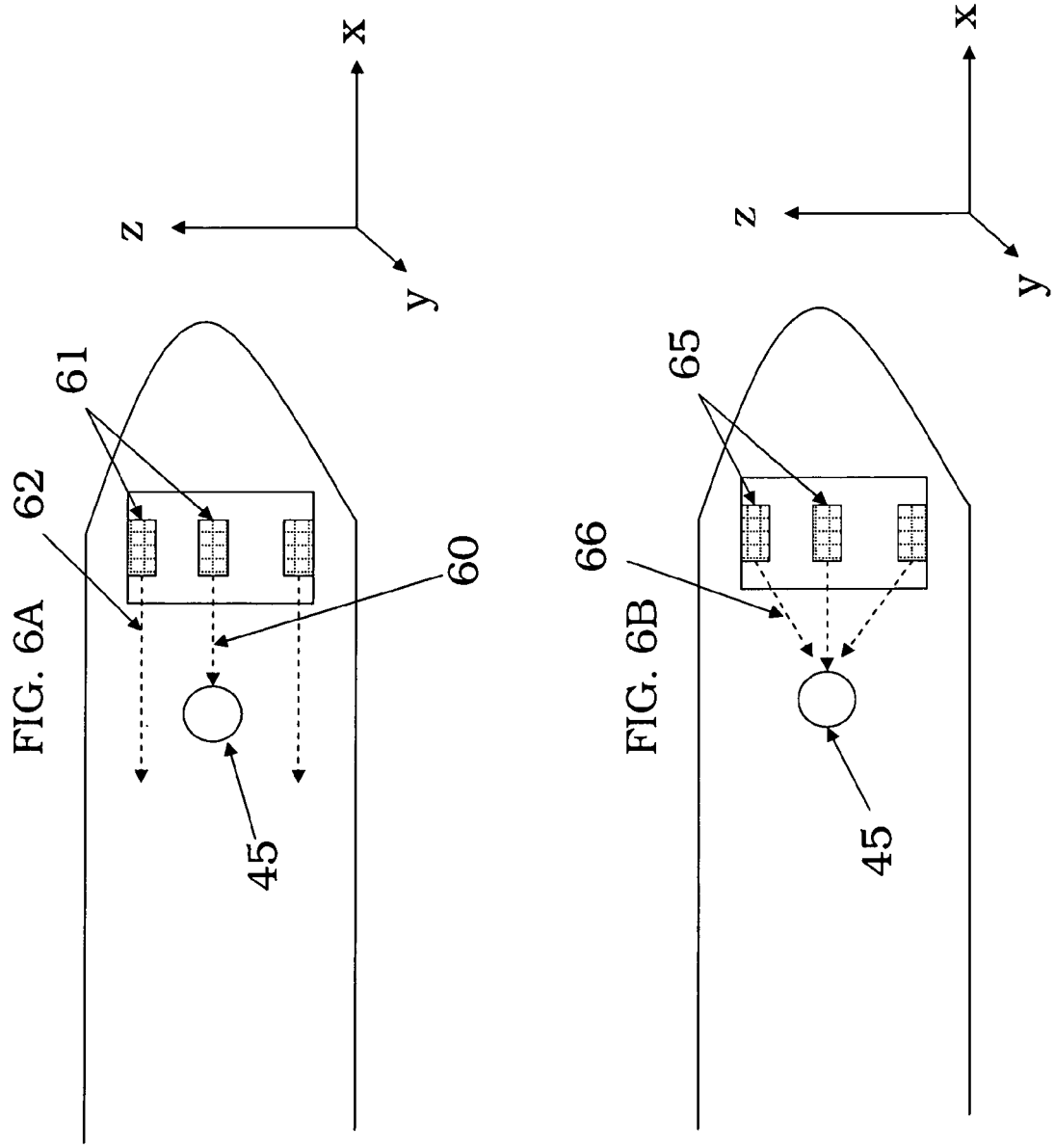

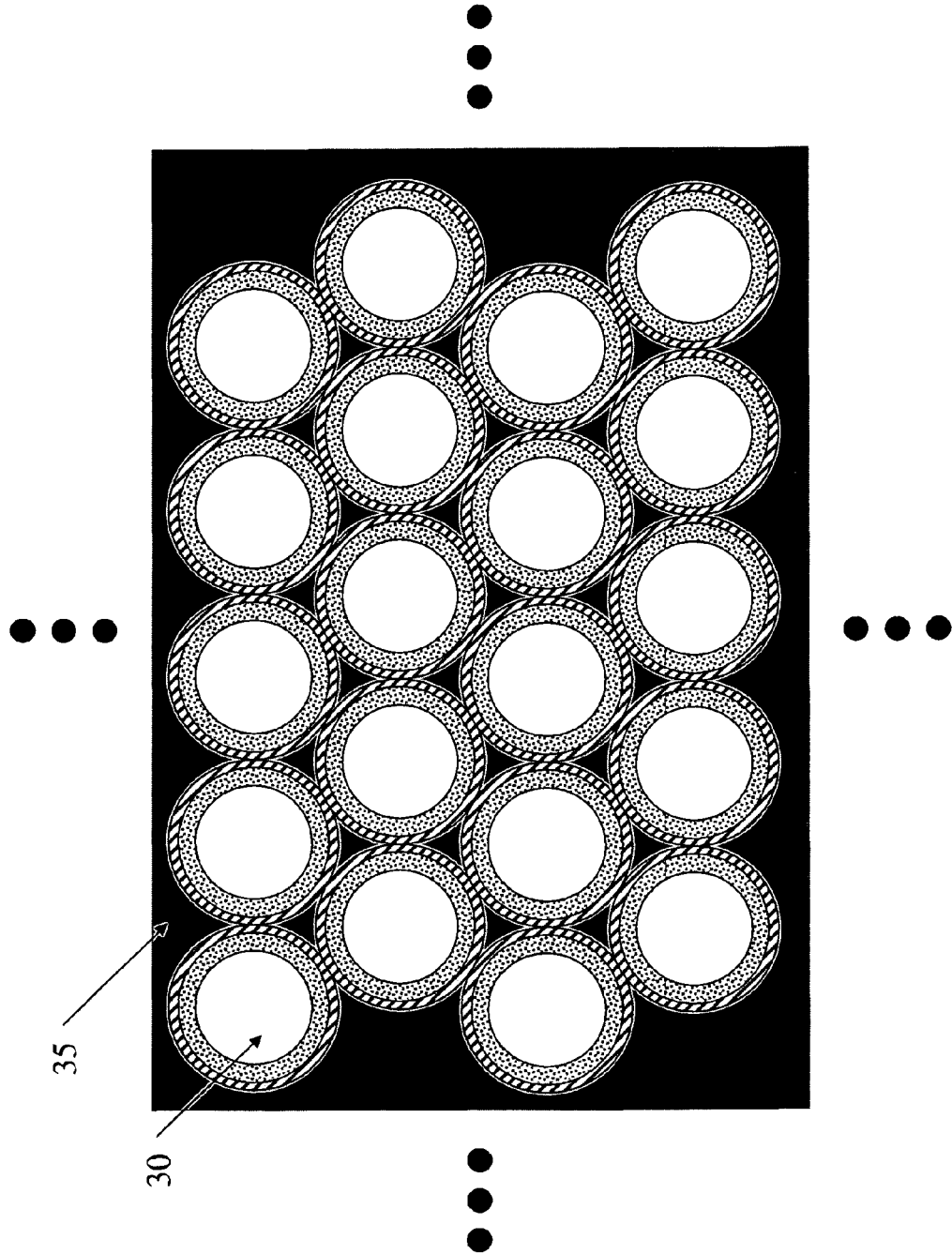

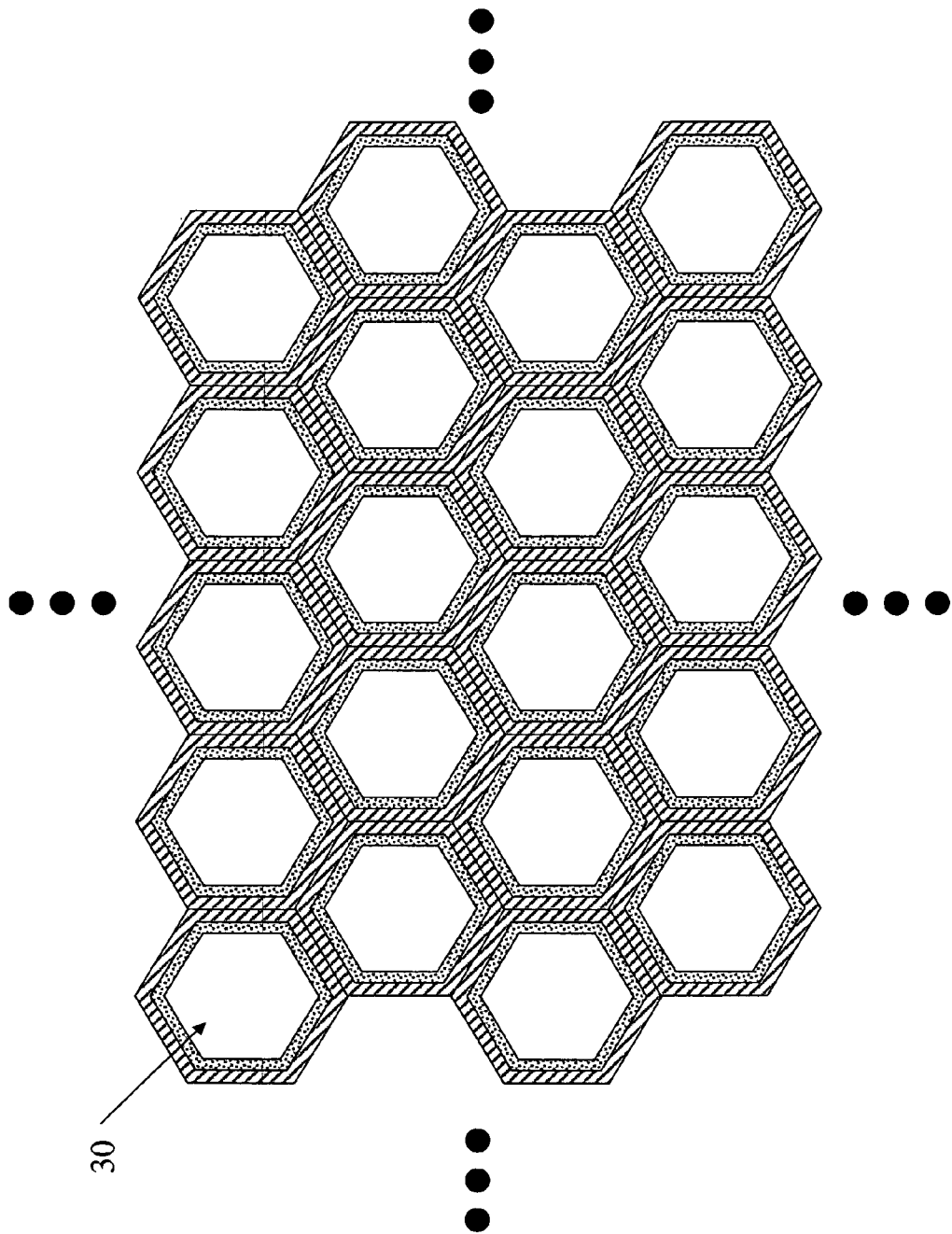

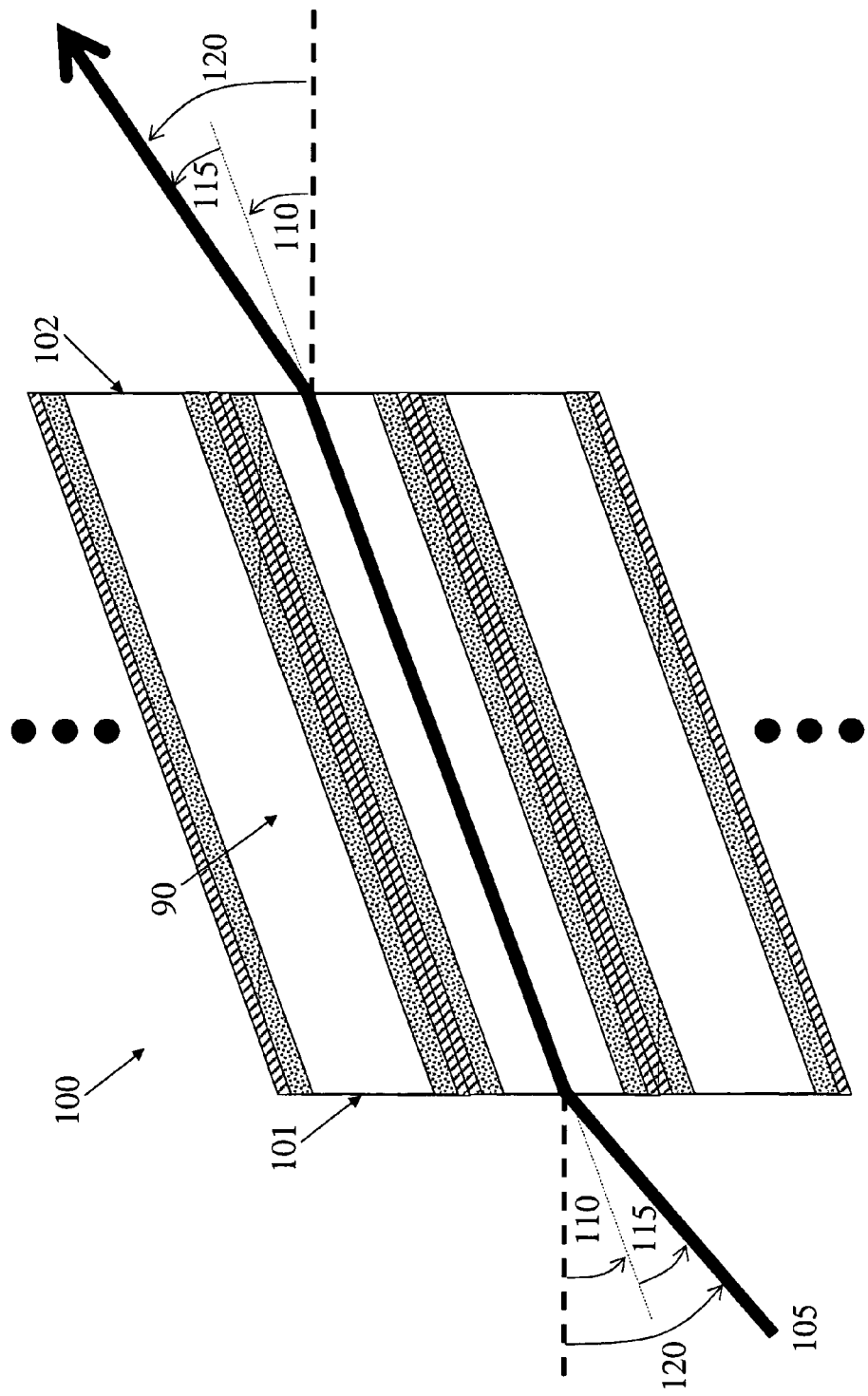

CHANNELIZED PLATE

CROSS-REFERENCE TO RELATED APPLICATIONS

This is a non-provisional patent application and claims priority to co-pending application No. 61/076,127.

TECHNICAL FIELD

Exemplary embodiments generally relate to an optical plate containing a plurality of optical channels or fibers. It is noted that the terms 'channel' and 'fiber' may be used interchangeable throughout this disclosure—embodiments simply require an optical path that can transmit light in selected directions. Exemplary embodiments effectively aim the light emission and/or limit the emission angle of light from a display device, including but not limited to a liquid crystal display (LCD). The invention is particularly applicable in situations where stray light emission from the LCD is problematic, either from the perspective of the primary observer or for any other reasons.

BACKGROUND OF THE ART

Most LCDs used to display a dense amount of information employ a backlight assembly to generate light that passes through a stack of components consisting of a variety of glass and plastic layers, including the liquid crystal (LC) layer and its controller that is typically a thin-film transistor. A typical LCD contains millions of pixels each consisting of red, green, and blue sub-pixels that are individually controlled to determine the instantaneous color for each pixel of the display. The specific makeup of the overall LCD stack of components determines the visual properties of the displayed image including brightness, color range, resolution, and viewing range.

The light that exits an LCD must compete with any surrounding ambient light in order for the LCD to be readable by the observer. In addition, light typically exits the LCD in a large range of angles and ultimately reflects off any surrounding surfaces, thus adding even more to the ambient light environment that the directly-observable light from the LCD must compete with. These problems may increase as the LCD becomes brighter and/or the surrounding reflective surfaces become closer to the LCD and/or the observer.

In some environments the reflection of stray LCD light off of surrounding surfaces creates a situation that is highly problematic for the observer. This phenomenon is particularly critical, for example, in the relatively tight confines of an aircraft cockpit. To make matters worse, an aircraft cockpit typically contains many metallic and glass surfaces which easily reflect both the ambient light and the non-direct LCD light, herein lumped into the single term stray light, and the pilot also needs to have excellent visibility through the windows or canopy of the cockpit. However, such stray light can be problematic in many other environments including but not limited to, automobiles, watercraft, and heavy equipment.

Summary of Exemplary Embodiments

Exemplary embodiments preferably aim the light emission from an LCD directly towards the observer. Further embodiments reduce the emission angles from the LCD thereby reducing the amount of stray light available for problematic reflections. Advanced embodiments can perform these functions in two and three dimensions and at angles that are not normal (i.e., perpendicular) to the surface of the display. In a preferred embodiment, small optical channels combined in plurality into a multi-channel plate are used to select both the nominal and range of viewing angles. The optical axis of the channels has a minimal amount of light absorption so that the brightness of the LCD is not significantly sacrificed from the perspective of the viewer. Depending on the specific manufacturing techniques and/or application requirements the channels may have a variety of cross-sectional shapes, including but not limited to circles, ovals, squares, and hexagons. A coherent multi-channel plate is created by aligning a plurality of the channels into a matrix. The multi-channel matrix may contain an additional feature called extra-mural absorption (EMA) material that can absorb stray light that is not passed or otherwise rejected by the individual optical channels.

In previous art, light controlling films have been utilized for similar applications. Among other shortcomings of this approach, the overall brightness of the display is often sacrificed, and it is also difficult to reduce stray light by tightly limiting the range of emission angles. By contrast, exemplary embodiments offer higher optical efficiency and can effectively direct light at desired angles with a tightly controlled range of emission angles. This simultaneously results in a brighter display and less stray light that can cause problematic reflections.

The foregoing and other features and advantages of the exemplary embodiments will be apparent from the following more detailed description of the particular embodiments of the invention, as illustrated in the accompanying drawings.

BRIEF DESCRIPTION OF THE DRAWINGS

A better understanding of exemplary embodiments of the invention will be obtained from a reading of the following detailed description and the accompanying drawings wherein identical reference characters refer to identical parts and in which:

FIG. 4A is a simplified side view of an airplane cockpit where the LCD light is emitted normal (perpendicular) to the display surface;

FIG. 4B is a simplified side view of a airplane cockpit where an embodiment effectively aims the LCD light emission in the XY plane toward the pilot;

FIG. 6A is a top view of an airplane cockpit where the LCD light emission is directed either normal to the display surface or within the XY plane;

FIG. 6B is a top view of an airplane cockpit where the LCD light emission is directed at least within the XZ plane;

FIG. 9A is a top view of a channelized plate consisting of optical fibers and their stacking order in a matrix fashion as a permanent configuration or as they may exist prior to thermal fusing;

FIG. 9B is top view of optical fibers from FIG. 9A after thermal fusing, which may approach a hexagonal shape after the thermal fusing process;

FIG. 12 is a cross-sectional view illustrating how a fiberoptic plate can essentially select the nominal transmission direction of the backlight in an LCD.

DETAILED DESCRIPTION

Figure 1:
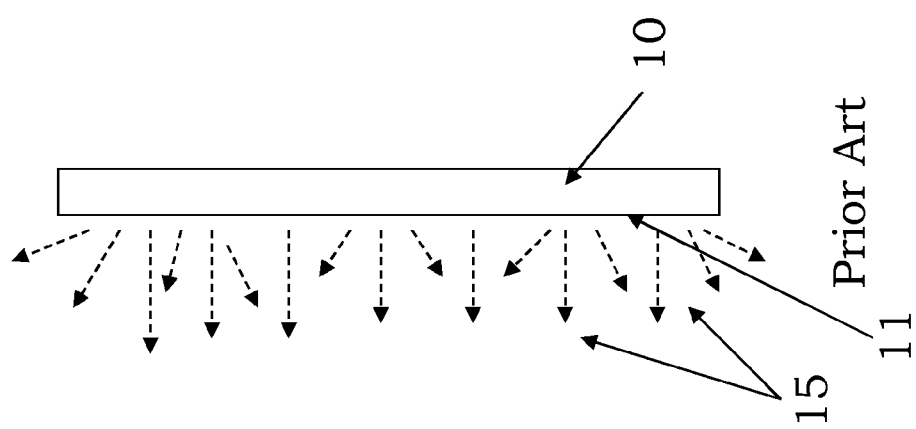
FIG. 1 is a simplified side view of a traditional LCD showing no directional steering or angular limitation of the light emission from the display.

FIG. 1 shows a simplified side view of an LCD 10. Light 15 is shown emanating from the front surface 11 of the LCD 10. The light 15 leaves the front surface 11 of the LCD 10 in a large range of angles. In other words, there is a broad range of light emission 15 from the LCD 10, and much of this emission 15 can become problematic stray light.

Figure 2:
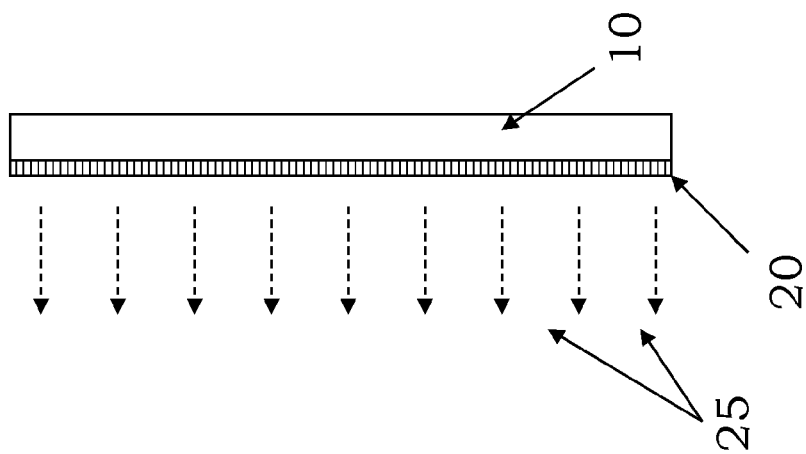
FIG. 2 is a simplified side view of a traditional LCD with the addition of an embodiment that results in controlled directional emission properties of the display.

FIG. 2 shows a simplified side view of an LCD 10 with a relatively simple embodiment of the channelized plate 20. The light 25 leaves the plate 20 at an angle that is substantially normal (i.e., perpendicular) to the front surface of the plate 20. In this embodiment the natural angular-filtering properties of optical fiber (or channels) provide significantly reduced stray light emission 25 from the LCD 10 relative to the stray light 15 that is produced by the LCD 10 in FIG. 1.

Figure 3:
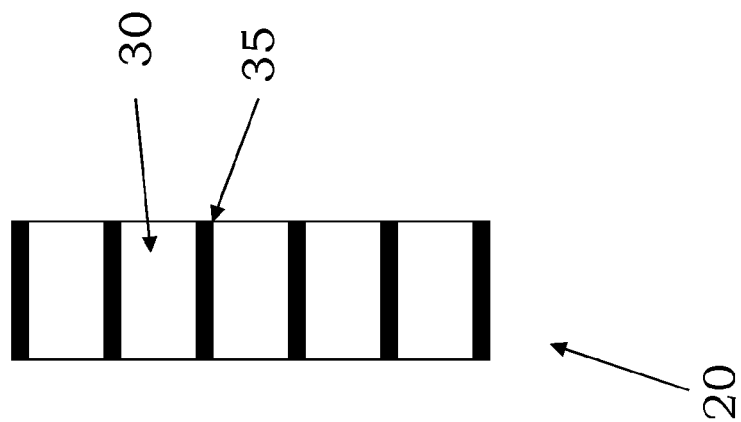
FIG. 3 is a simplified cross-sectional view of the embodiment shown in FIG. 2.

FIG. 3 shows a simplified view of the channelized plate 20 from FIG. 2. The plate 20 comprises a plurality of channels 30 that in a preferred embodiment are optical fibers. The channels 30 may have a variety of cross-section shapes, including but not limited to circles, ovals, squares, and hexagons. The size of the channels or fibers can vary, depending on the application. An exemplary embodiment may have fibers on the order of 50-150 microns in diameter which are so-called multi-mode fibers at visible wavelengths. The fibers 30 may be aligned together, but depending upon the particular shape of the channel or fiber, there may be a space 35 between adjacent fibers 30 that may be filled with a solid material such as an opaque or light-absorbing material. In some embodiments, the space 35 may simply comprise air or some other gas.

In exemplary embodiments, an extra-mural absorption (EMA) material may be placed between the fibers 30 to absorb light that is not adequately passed by the fibers 30. EMA can be inserted into an array of fiberoptic channels in a number of different configurations. A statistical configuration may be used, where small rods of light absorbing glass are inserted into the matrix as replacements for individual light-conducting fibers. Alternatively, an interstitial configuration may be used, where EMA is injected into the interstitial spaces between fibers. Further, a circumferential EMA may be used, where the EMA is added as a complete jacket around each individual fiber. Different EMA configurations can be used, alone or in combination, depending on the particular manufacturing techniques and end-item application.

The embodiments shown in FIGS. 2 and 3, direct the LCD light at an angle that is substantially normal (perpendicular) to the front surface of the LCD. This simple embodiment alone can provide a drastic improvement over the traditional broadly scattered light which emits from a standard LCD, as shown in FIG. 1. The embodiments in FIGS. 2 and 3 may also angularly constrain the light emission in a controlled and specific manner and therefore reduce the traditional stray light emission that can problematically brighten the surrounding environment for the observer.

FIG. 4A illustrates an application of the embodiments from FIGS. 2 and 3 using the cockpit of an airplane as an example, although the applications for the invention are by no means so limited. An instrument panel 41 is traditionally located at some angle relative to the pilot/observer 45. In modern cockpits the instrument panel 41 generally contains several LCDs 40. Using the embodiments from FIGS. 2 and 3, the light 43 from the LCDs 40, although angularly constrained, travels in a direction that is substantially normal to the front surface of the LCDs 40. Depending on the relative angle between the observer 45 and the LCDs 40, the light 43 may travel directly towards the observer 45 or may reflect off the canopy 42. If possible, the LCDs 40 may simply be repositioned so that their light emission mostly travels directly towards the observer 45. However, if such repositioning of the displays is not possible or practical the displays 40 may be difficult to read by the observer 45. Also, the reflecting light 43, although angular constrained, may continue to brighten the surrounding environment making it difficult for the observer 45 to read displays and/or for the observer to have good visibility of objects outside of the canopy. Thus, further means may be required to effectively aim the light emission 43 directly towards the observer 45.

FIG. 4B shows an exemplary embodiment where LCDs 46 contain an embodiment of the channelized plate that aims light 44 within the XY plane. This reduces the stray light reflection off of the canopy or any other surrounding surfaces. This allows a relatively bright LCD to be used while simultaneously minimizing problematic stray light that would add to the brightness of the surrounding environment.

Figure 5:
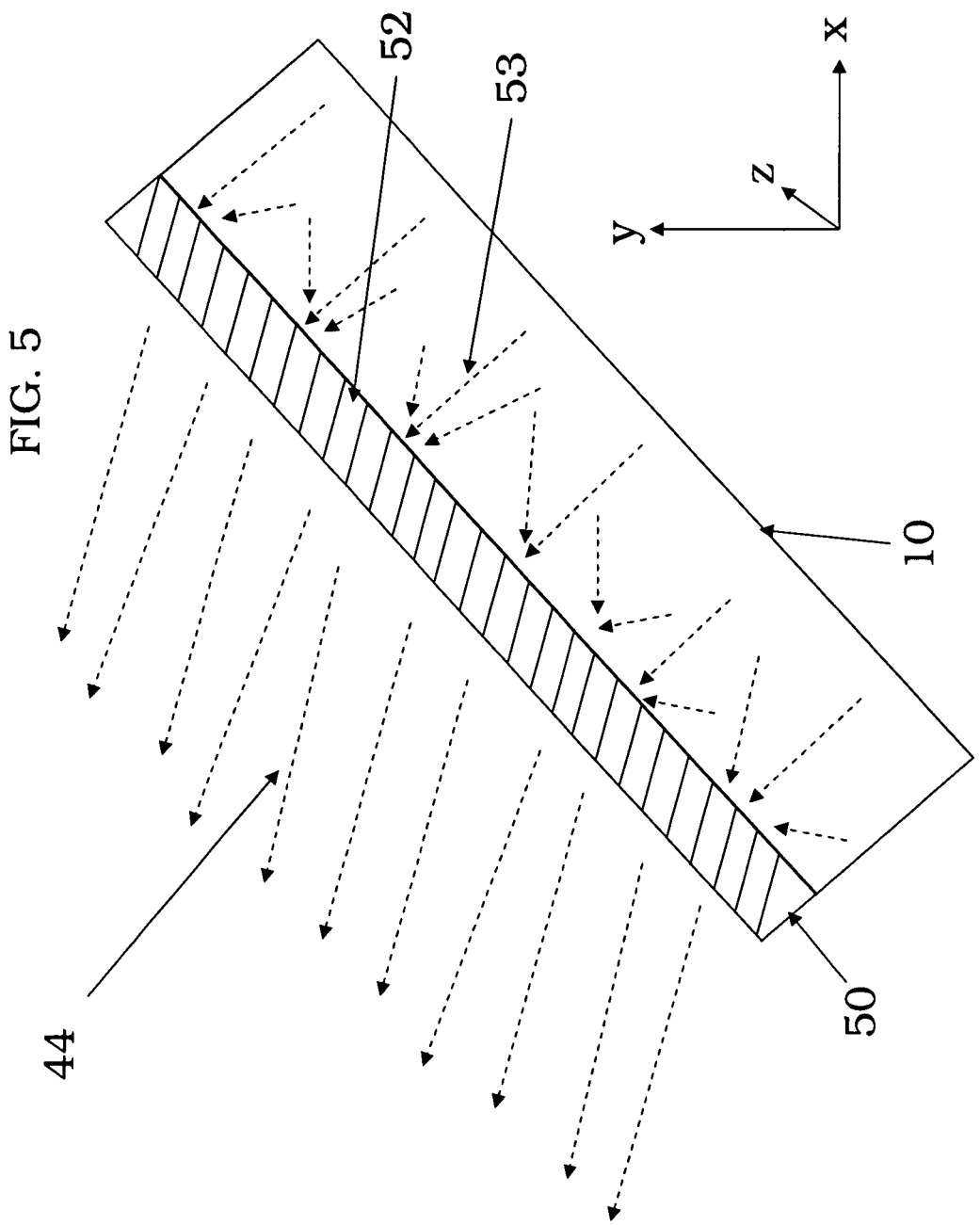
FIG. 5 is a simplified cross-sectional view of the invention embodiment shown in FIG. 4B.

FIG. 5 provides a more detailed, though still simplified, view of the LCD assembly 10 with an embodiment of the channelized plate 50. Light 53 emanates from the backlight of the LCD assembly 10 and then passes through the channels 52 of the plate embodiment 50. Light 44 exits the panel 50 at the appropriate nominal angle towards the observer. The channels 52 may be oriented at virtually any angle, the optimal angle depending on the angle of the LCD assembly 10 relative to the location of the observer. It should be noted that the relative size of the LCD assembly 10 and the size of the channels or fibers 52 are not to scale. Although embodiments could contain larger fibers, exemplary embodiments may contain fibers 52 with core diameters as small as 50-150 microns. In FIG. 5 the size of the fibers 52 relative to the LCD assembly 10 has been exaggerated for explanatory purposes. An actual fiberoptic panel may contain many millions of optical fibers.

Although the light emission from the displays may be properly aimed at the observer in the XY plane per FIG. 5, there may still be an issue with stray light emission in the XZ plane. Viewing the airplane cockpit from the top as shown in FIG. 6A, LCDs 61 all have the same orientation in the XZ plane. Light emission 60 travels directly towards the observer 45, but light emission 62 travels past the observer 45 as it is not aimed properly based on the angle of the LCDs 61 relative to the observer 45 in the XZ plane.

FIG. 6B shows an embodiment which also corrects for the angle of the LCD light emission within the XZ plane. LCDs 65 contain a similar embodiment of the channelized panel that was presented in FIG. 5 that also effectively aims the direction of the light emission 66 within the XZ plane so that it travels directly towards the observer 45.

It should be noted, that the optimal angle of the fibers within the channelized panel depends upon the relative angle of the face of the LCD to the observer's line-of-sight. When selecting the angle of the fibers and range of emission angles one should also consider the range of motion of the observer in the XZ plane. One should also consider the range of motion in the XY plane, or the total variations in line-of-sight that can be found among the observer or observers. For example, observers of all possible heights and orientations should be considered in order to ensure that all possible observers/positions can properly read the LCDs.

The optical channels in the invention may simply constrain the emission angle and aim the light in a direction that is normal to the LCD front face as shown in FIG. 2 provided that this simple embodiment is satisfactory to the observer's line-of-sight and application. For example, this simple embodiment may work well for applications where the mounting angle of the display can be changed within the instrument panel. However, it is often the case that the mounting angle of the LCD is mandated by manufacturing, legacy, and/or available space considerations and cannot be altered. In these situations the orientation of the optical channels of the invention must change in order to effectively aim the light emission within the XY plane, the XZ plane, or both planes simultaneously.

Figure 7C:
FIGS. 7A, 7B, and 7C are top, front, and side views respectively of a single channel within a channelized plate wherein light emission from an LCD is directed in both the XY and XZ planes.
Figure 7A:
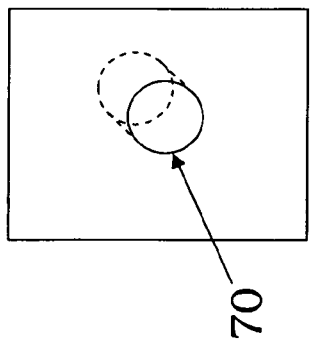
Figure 7B:

FIGS. 7A, 7B, and 7C are the top, front, and side views respectively of a plate containing a single fiber 70 (for the sake of simplicity) that would aim light in both the XY and XZ planes.

Figure 8:
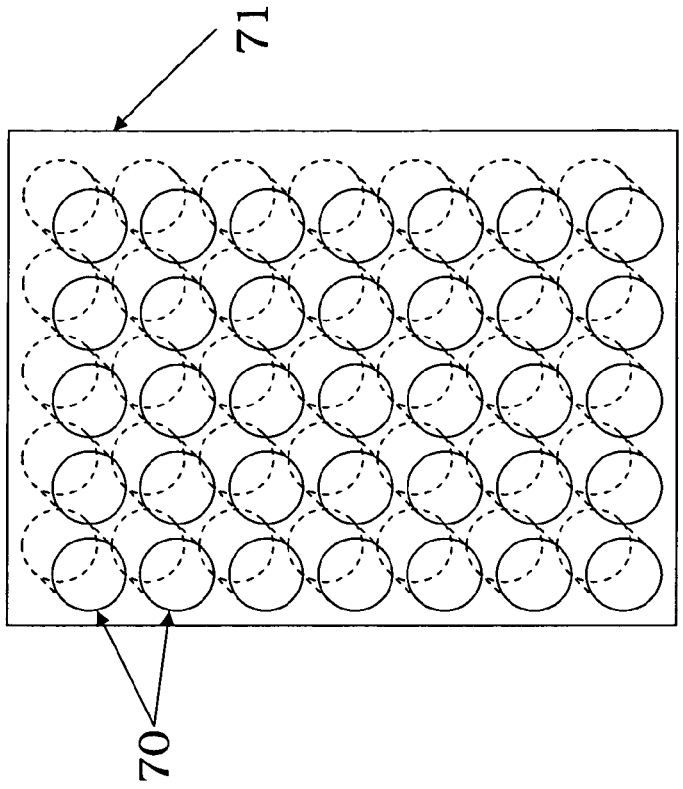
FIG. 8 is a top view of a plate with a plurality of channels which direct light emission from an LCD in both the XY and XZ planes.

FIG. 8 is a top view of a plate 71 that contains a plurality of fibers which would angle light in both the XY and XZ planes. Again, the relative size of the fibers 70 to the overall plate 71 has been exaggerated for explanatory purposes. Also, the precise angle of the fibers in both the XY and XZ planes would depend on the angle of the LCD relative to the line-of-sight of the observer.

In an exemplary embodiment the channelized plates disclosed herein could be formed in fiberoptic blocks (sometimes called boules) that contain a matrix of fibers fused together under heat and pressure. The fibers may initially be stacked as illustrated in FIG. 9a, and after fusing start to approach the hexagonal shapes illustrated in FIG. 9b. Exemplary fiber optic plates may be produced by companies such as Schott Fiber Optics in Southbridge, Mass. For example, a plate may then be sliced in wafer from the boule, and then ground and polished to the desired size. In this manner the boule may yield many individual plates. The front faces of the plate may remain uncoated or may be coated with polarizer, anti-reflective, or any other coating appropriate for a specific application.

Additionally, the term 'plate' has been used throughout this disclosure to describe some embodiments. It should be noted that the use of the term 'plate' does not require that the opposing surfaces of the plate to be parallel. For example, the front surface of the plate may be at a different angle within the XY and XZ planes than that of the rear surface of the plate. These surfaces may be angled and/or oriented in order to accommodate the instrument panel location constraints, manufacturing concerns, and/or provide for special optical emission properties.

Although embodiments have been shown and described in relation to aircraft cockpits, it should be noted that embodiments can be utilized in any environment where the viewing of an LCD and/or the surrounding environment is hindered by ambient light or the reflection of LCD light off surrounding surfaces or both. Those skilled in the art can easily apply the exemplary embodiments to many other applications including but not limited to watercraft, automobiles, motorcycles, snowmobiles, ATVs, construction equipment, heavy machinery, and any form of instrument panel or display assembly.

The light passing through exemplary embodiments has been shown with straight arrows, or light rays, having a dashed body for convenience as is traditionally done in similar subject matter. However, in reality light travels as a wave, which is well-known to those skilled in the art. Light rays have simply been used for explanatory purposes and to simplify the figures and descriptions. As such, stray light that is not adequately contained or controlled by the optical channels may exit the plate at random angles. The EMA techniques taught above can help to reduce or eliminate this stray light. However, even without the EMA techniques a substantial majority of the light emission consists of light that is properly directed by the channels.

Figure 10:
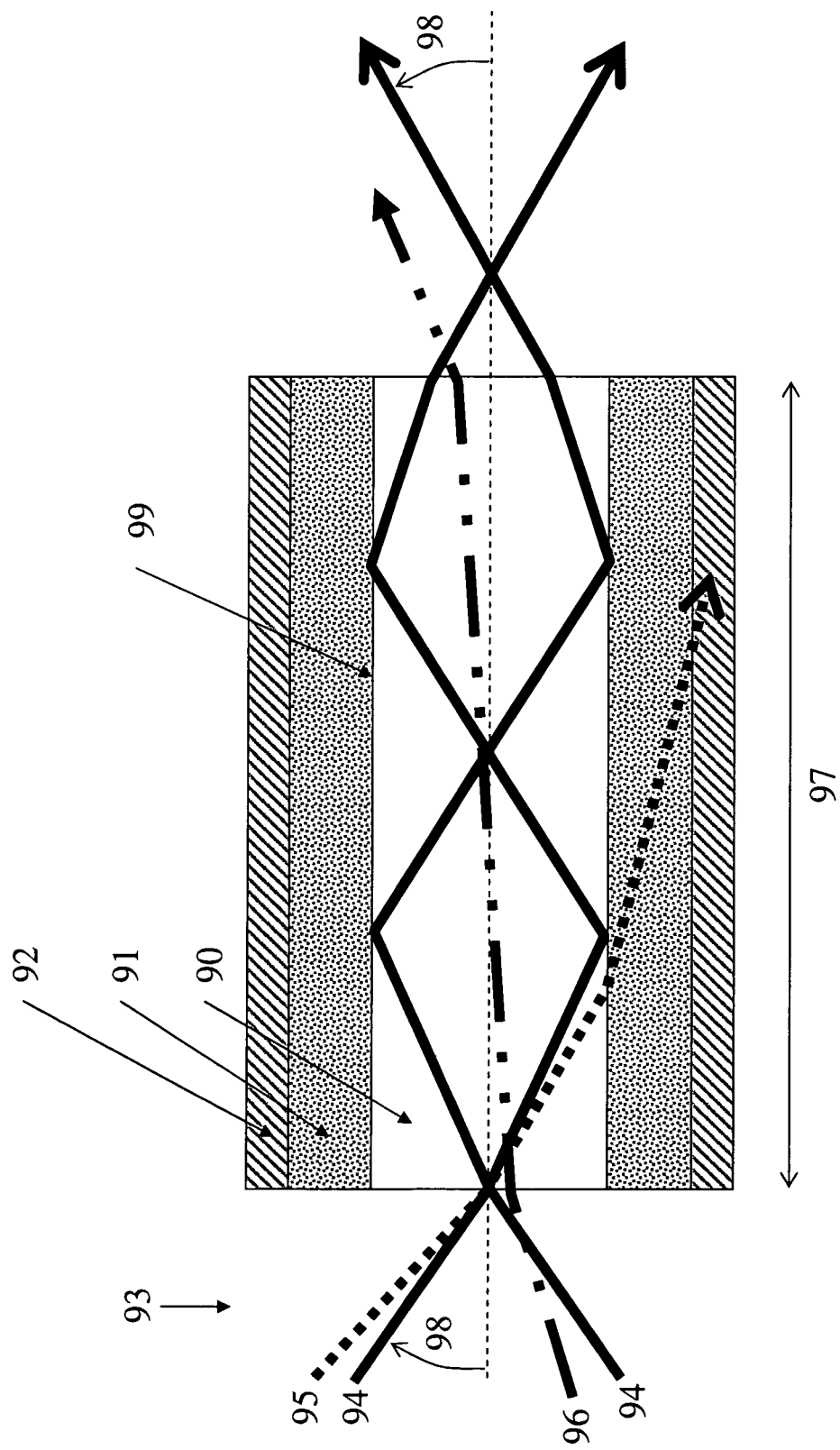
FIG. 10 is cross-section of an optical fiber which illustrates the principles by which optical fiber can limit the emission angles of transmitted light.

FIG. 10 illustrates the method by which an optical fiber performs an angular filtering function that can be advantageously employed to constrain the light emission angle from a display device such as an LCD. In FIG. 10 a single fiber within the channelized plate is shown to consist of an optical core 90 that has a refractive index of $n_1$, surrounded by a cladding layer 91 that has a refractive index of $n_2$, and an optional surrounding layer 92 that may be light-absorbing as previously described in the EMA techniques. In typical applications $n_1 > n_2$ by a very small amount on the order of 1% or less. In FIG. 10 rays of light from the backlight of the display enter the fiber on the left-hand side and exit the fiber on the right-hand side. For simplicity it is assumed that there is air 93 of refractive index $n_0$ on both sides of the fiberoptic plate, but as mentioned previously this is not a strict requirement. Rays of light that enter the optical core at an angle less than the critical angle 98, such as rays 94, will be passed by the fiber and exit at the same angle 98, while rays that exceed the critical angle 98, such as ray 95, will be lost and effectively filtered by the optical fiber. Depending on the thickness of the plate 97 some rays such as ray 96 pass straight through the core and never reflect off of the interface 99 between the core 90 and cladding 91. Rays such as 96 therefore have the maximum transmission efficiency. The thickness of the plate 97 and diameter of the core 90 should be chosen such that ray angles greater than the desired critical angle always reflect at least once from the core/cladding interface 99 so that they are effectively filtered by the plate. The ray angles that are passed by the optical fiber are given by Eq. 1.

$$A[\deg] \leq 180/\text{pi} * a \sin\{n_1/n_0 * [\text{pi}/2 - a\sin(n_2/n_1)]\} \qquad \text{Eq. 1}$$

Figure 11A:
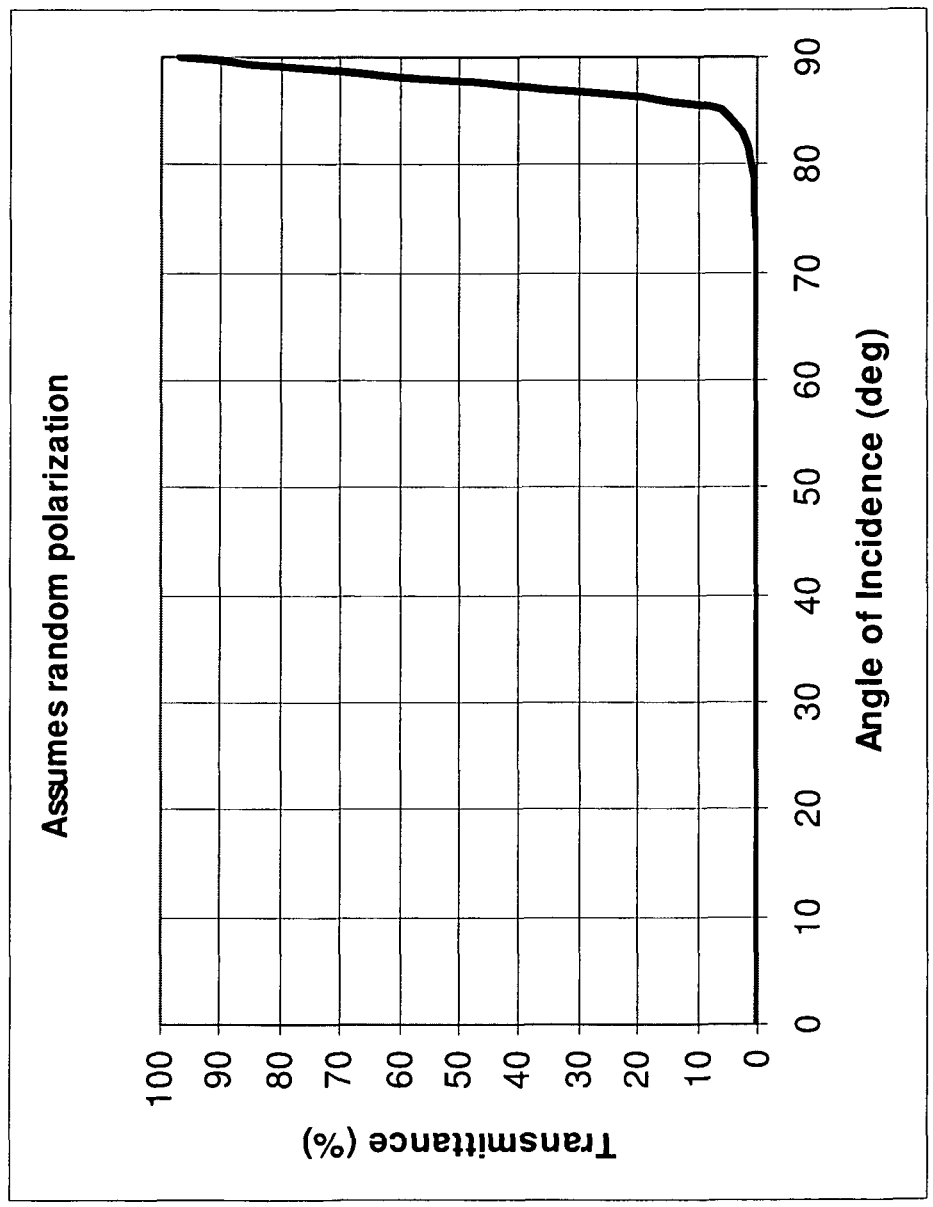
FIG. 11A is a chart which illustrates the transmission properties of light within the core of an optical fiber at the core/cladding interface as a function of the angle of incidence.

FIG. 11a helps to illustrate how the transmission profile vs. ray angle is formed by the channelized plate. Any ray that strikes the core/cladding interface is subject to an amount of optical power reflection (or equivalently, transmission) that is determined by the well-known Snell's law. An example of Snell's law is shown in FIG. 11a for the case of a single reflection from the interface of a core refractive index of 1.44 and a cladding refractive index of 1.45. It is noted in this figure that an optical angle of incidence of 90 degrees corresponds to light that is parallel to the axis of the fiber core. It is observed in FIG. 11a that the transition from 0% transmission to ~100% transmission can occur over just a few degrees of ray angle, and this can be very advantageous for the subject applications in order to reduce problematic stray light.

Figure 11B:
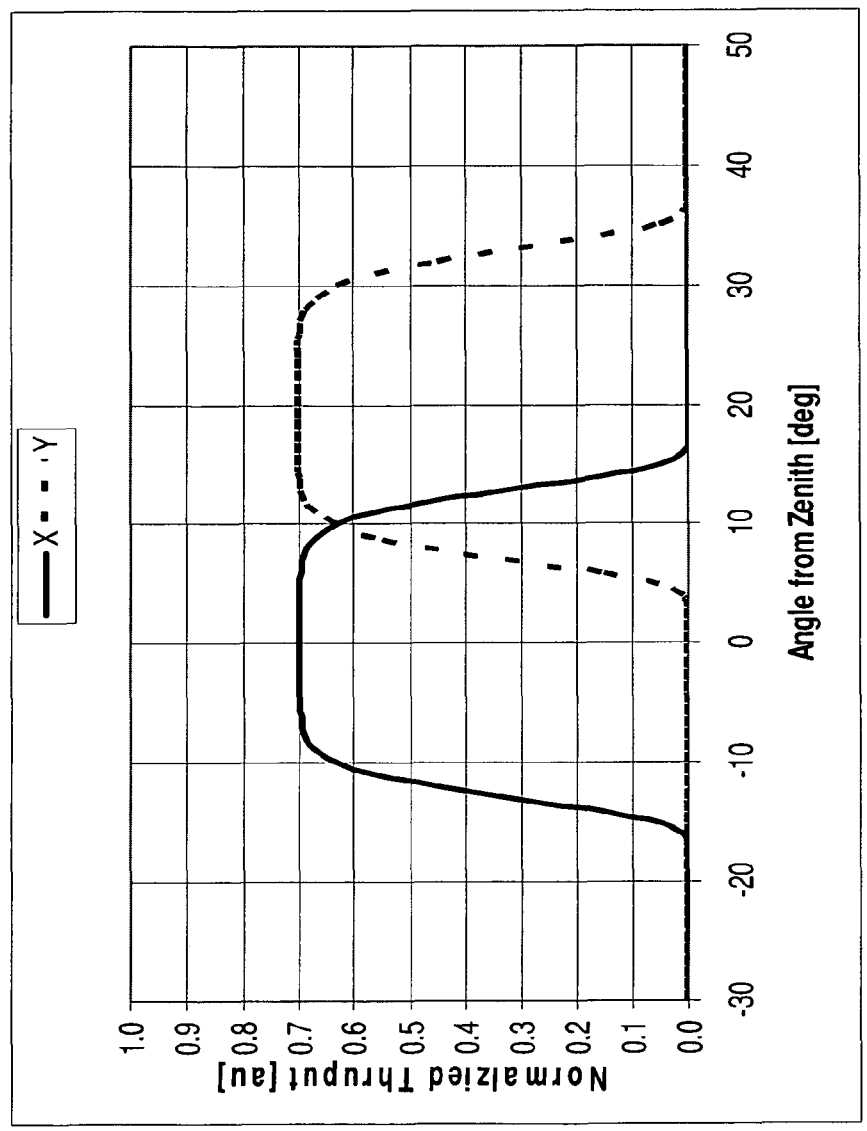
FIG. 11B is a chart which illustrates an example of the angular transmission properties of a fiberoptic plate that has been designed to steer light 0 deg. in the XZ plane and 20 deg. in the XY plane, with a half-max emission range of about 25 deg.

FIG. 11b illustrates an example channelized plate transmission profile, or equivalently range of emission angles, at the output side of the channelized plate. In this particular example the light emission is being effectively steered at a nominal angle of 20 degrees in the Y axis, but is not being steered in the X axis. The reason that the profiles have a flat top is that some rays such as ray 96 in FIG. 10 pass through the plate without ever reflecting from the core/cladding interface, and these rays have the maximum possible transmittance. The width of this flat top transmission region is proportional to the ratio of the core 90 diameter to plate thickness 97. The steepness of the side walls of the transmission profile are basically governed by the aforementioned Snell's Law as illustrated in FIG. 11a. The reason that the transmission profiles do not peak at 100% in FIG. 11b is due to the fact that the fill-factor of the fiber cores vs. the interstitial blocking/absorbing regions has been accounted for; which in this illustrated case results in a peak transmission efficiency of 70%. It should be noted that the values of the graphs which are shown in FIGS. 11a and 11b are only exemplary, and these can be modified for different applications of exemplary embodiments. These graphs are used for explanatory purposes only and should not be used to limit the scope of the invention.

FIG. 12 illustrates the method by which a channelized plate 100 can effectively aim the light emission from a display. For simplicity only three of the potentially millions of fibers in the plate are shown in FIG. 12. As in FIG. 10 rays of light from the backlight of the display enter the fibers on the left-hand side 101 and exit the fibers on the right-hand side 102. The cores of the fibers 90 have been tilted at angle 110, denoted herein by $A_F$. A light ray 105 centered on the core of the fibers will have a relative angle 115 to the core of the fiber, denoted herein by $A_R$. The resulting emission aim angle 120 relative to horizontal will be the sum of $A_F+A_R$. It is noted that for simplicity FIG. 12 only illustrates light aiming in one plane, but in general light can be aimed in two planes by having a compound tilt of the fiber cores.

Again, the exemplary embodiments have been described herein with simplified diagrams and figures for explanatory purposes. The following variations for exemplary embodiments should be noted.

The different fibers within the plate are not required to have the same tilt angle 110 as shown in FIG. 12. This could allow for special aiming functions such as towing in of the outer edges of the display in order to further restrict the observer's viewing range and/or to provide enhanced stray light reduction.

Additionally, the fibers are not required to have a constant core diameter from the input side of the plate 101 to the output side of the plate 102. This could allow many special features such as improving the effective fill factor of the channelized plate, effectively changing the size of the display, and/or altering the light emission angle.

Furthermore, it is not required that the input face of the plate 101 be parallel to the output face 102. For example, a relative angle between the input and output faces can allow for additional control of the nominal steering angle of the light emission. Further, neither the input face 101 or output face 102 are required to be flat, but instead may have curved profiles that can serve to further customize the emission of light from the plate. Further, a plate that has been initially fabricated with flat and parallel input and output faces may be post-processed to be mechanically curved in order to further customize the emission of light from the plate. It is noted that this curvature may be spherical, cylindrical, or any desired curvature. It will be observed by those skilled in the art that combinations of the above features, and many other shaping approaches, are easily included in the spirit of the invention for enhancing the control of light emission from the display.

Finally, other layers may be added to the input and output faces of the channelized plate in order to alter the optical properties of the plate, which may include anti-reflection coatings, polarization-dependent coatings, lensing layers (for example, cylindrical or spherical Fresnel lenses for altering the emission aiming properties), index-matching layers to liquid crystal glass, and others that are commonly known to those skilled in the art.

Figure 13:
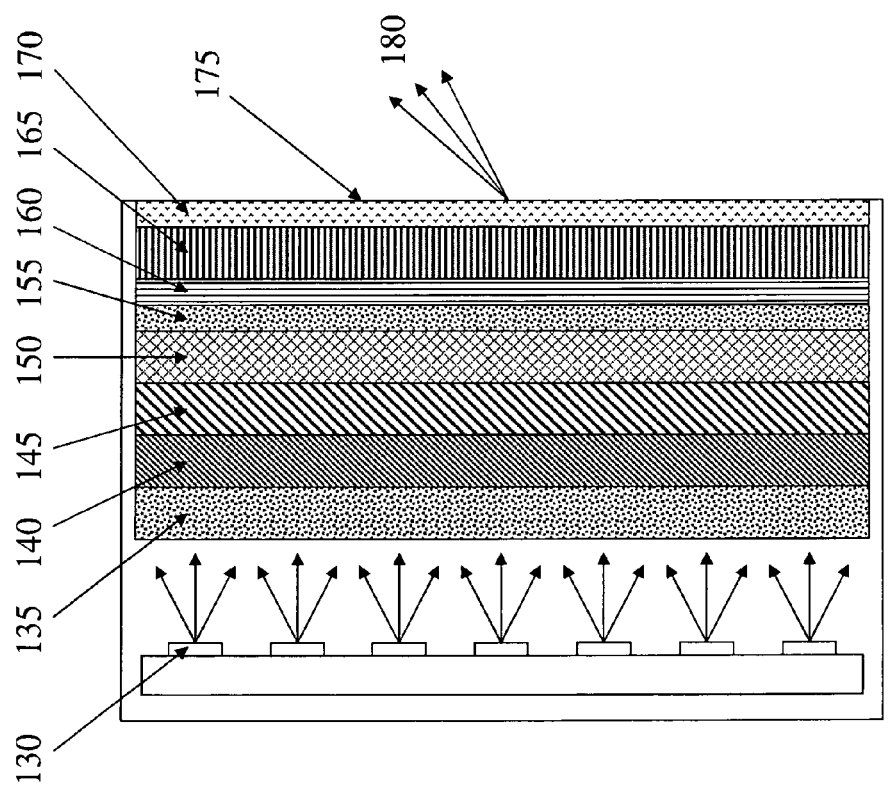
FIG. 13 is a cross-sectional view of an exemplary component stack up using a fiberoptic plate embodiment within an LCD.

The makeup of a full LCD containing a channelized plate is illustrated in FIG. 13 for explanatory purposes only and is not intended to limit the scope of invention. Further, FIG. 13 is not drawn to scale for the sake of clarity since many of the identified components can be exceptionally thin.

An LCD which contains a fiberoptic plate may be comprised of the following components: 1) light sources 130 that are represented here as light-emitting diodes or LEDs, 2) a bulk diffuser layer 135 that serves to uniformly distribute or homogenize the light from the light sources 130, 3) an optional light-turning element 140 that serves to align the strongest components of light leaving the diffuser 135 to the optical axis of the channels in the plate 145 in order to increase the overall optical transmission efficiency of the channelized plate (this may be relatively simple image directing films, or IDF, such as produced by vendors like 3M Vikuiti), 4) the subject channelized plate invention 145 that in general may effectively steer the light in two orthogonal planes, 5) an optional lensing element 150, such as a Fresnel lens, that further alter the angular distribution of light emission from the LCD, 6) a relatively mild optional post-diffuser 155 that can serve to eliminate so-called Moire-patterns that can result from the spatial sampling differences between the light-turning element 140, the channelized plate 145, and the lensing element 150, and can also serve to blur or disguise any blemishes or defects in the same components, 7) a linear polarizer 160 that passes light that is polarized along a preferred direction for proper operation of the liquid crystal glass 165, 8) the liquid crystal layer 165 (that is actually composed of several layers including a thin-film transistor, circuitry, the liquid crystal material, and additional layers of plastic or glass), 9) another linear polarizer 170 that has its axis rotated 90 degrees with respect to the first polarizer 160, and, 10) any other optical layers 175 on the surface of the LCD that serve a particular application, including but not limited to anti-reflection and polarization-dependent coatings.

The optical emission from the LCD 180 possesses the desired aiming direction to the observer(s) and the desired viewing range for the intended positions of the observer(s). It is noted that components 130 and 135 comprise what is commonly called the backlight of the LCD. Although a diffuser 135 may not be required, in preferred embodiments a diffuser is included. Backlights can be comprised of one of many technologies including but not limited to LEDs, cold-cathode fluorescent lamps (CCFL), organic LEDs, and light-emitting polymers. It is also noted that the backlight may be 'edge-lit' using any of the approaches commonly used in the industry.

Having shown and described exemplary embodiments of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention.

We claim:

1. An LCD comprising:
a backlight producing light in a plurality of angles;
a fiberoptic plate in front of said backlight adapted to permit only light within a selected range of angles to pass through the plate;
a light-turning element between said backlight and said fiberoptic plate which directs light only towards the selected range of angles;
a first linear polarizer in front of said fiberoptic plate;
a liquid crystal layer in front of said first linear polarizer;
a lens element placed between the fiberoptic plate and the liquid crystal layer; and
a second linear polarizer in front of said liquid crystal layer.

2. An LCD comprising:
a backlight producing light in a plurality of angles;
a channelized plate in front of said backlight adapted to permit only light within a selected range of angles pass through the plate;
a first linear polarizer in front of said channelized plate;
a lensing element between said channelized plate and said first linear polarizer;
a liquid crystal layer in front of said first linear polarizer; and
a second linear polarizer in front of said liquid crystal layer.

3. The LCD from claim 2 further comprising a diffuser element between said lensing element and said first linear polarizer.

4. The LCD from claim 3 further comprising an anti-reflective element in front of said second linear polarizer.

5. A method for filtering light from a LCD towards an intended observer, the LCD comprising a backlight placed behind a liquid crystal layer, the method comprising the steps of:
placing a channelized optical plate between the backlight and the liquid crystal layer, the channelized plate comprising a plurality of optical fibers oriented in the X-Y plane towards an intended observer of the LCD, where a desired range of angles of light within the X-Y plane has been selected;
accepting light from the backlight where the light rays travel at a plurality of angles in the X-Y plane relative to the axis of the fibers;
allowing light rays within the selected range of angles in the X-Y plane to pass through the fibers; and
absorbing light rays which are outside of the selected range of angles in the X-Y plane.

6. The method of filtering light from an LCD from claim 5 wherein
said channelized plate comprises optical fibers which are further oriented in the X-Z plane towards an intended observer of the LCD and where a desired range of angles of light within the X-Z plane has been selected;
and further comprising the steps of:
accepting light from the backlight where the light rays travel at a plurality of angles in the X-Z plane relative to the axis of the fibers;
allowing light rays within the selected range of angles in the X-Z plane to pass through the fibers; and
absorbing light rays which are outside of the selected range of angles in the X-Z plane.

7. A liquid crystal display assembly comprising:
a liquid crystal layer;
a backlight placed behind the liquid crystal layer; and
a channelized optical plate between the backlight and the liquid crystal layer, the plate having a plurality of axially parallel optical fibers which terminate at one end in an entrance surface and at the other end in an exit surface, wherein said fibers are adapted to
accept light through the entrance surface in a plurality of x-y angles which are defined as the angle between the axis of the fiber and the light ray within the x-y plane, and where a critical x-y angle is defined as the largest x-y angle where the corresponding light ray can substantially pass through said fiber without being absorbed;
emit light through the exit surface if the x-y angle is less than the critical x-y angle; and
substantially absorb light if the x-y angle is greater than the critical x-y angle.

8. The liquid crystal display assembly of claim 7 wherein:
the axis of the fibers are generally non-normal to the entrance surface within the x-y plane.

9. The liquid crystal display assembly of claim 7 further comprising:
light absorbing material disposed between said fibers.

10. The liquid crystal display assembly of claim 7 wherein:
said critical x-y angle is 15 degrees or less.

11. The liquid crystal display assembly of claim 7 wherein:
the distance between the entrance and exit surfaces causes light rays which enter at x-y angles greater than the critical x-y angle to reflect at least once off the fiber.

12. The liquid crystal display assembly of claim 8 wherein:
said entrance surface and exit surface are substantially flat and substantially parallel.

13. The liquid crystal display assembly of claim 8 wherein:
said exit surface has a curved profile.

14. The liquid crystal display assembly of claim 8 wherein:
said exit and entrance surfaces have curved profiles.

15. The liquid crystal display assembly of claim 8 wherein:
the axis of said fibers are directed towards an intended observer.

16. The liquid crystal display assembly of claim 7 wherein:
the axis of said fibers are generally non-normal to the entrance surface within the x-z plane; and
said fibers are further adapted to:
accept light through the entrance surface in a plurality of x-z angles which are defined as the angle between the axis of the fiber and the light ray within the x-z plane, and where a critical x-z angle is defined as the largest x-z angle where the corresponding light ray can substantially pass through said fiber without being absorbed;
emit light through the exit surface if the x-z angle is less than the critical x-z angle; and
substantially absorb light if the x-z angle is greater than the critical x-z angle.

17. The liquid crystal display assembly of claim 16 further comprising:
light absorbing material disposed between said fibers.

18. The liquid crystal display assembly of claim 16 wherein:
said critical x-z angle is 15 degrees or less.

19. An LCD comprising:
a backlight producing light in a plurality of angles;
a channelized plate in front of said backlight and containing optical fibers which permit light within a selected range of angles to pass through the plate while substantially absorbing light which is outside the selected range of angles;

a light diffusing layer placed between the backlight and the channelized plate;
a liquid crystal layer in front of the channelized plate; and
a lens element placed between the channelized plate and the liquid crystal layer.

20. The LCD of claim 19 further comprising:
a light turning element placed between the light diffusing layer and the channelized plate.

21. The LCD of claim 19 wherein:
the lens element is a Fresnel lens.

* * * * *